United States Patent [19]

Tooley

[11] 4,348,067

[45] Sep. 7, 1982

[54] BEARING SEAL

[75] Inventor: Robert W. Tooley, Osceola, Ind.

[73] Assignee: Reliance Electric Company, Mishawaka, Ind.

[21] Appl. No.: 126,451

[22] Filed: Mar. 3, 1980

[51] Int. Cl.³ .............................................. F16J 15/32
[52] U.S. Cl. ................................. 308/187.1; 308/36.1
[58] Field of Search ................ 308/187.1, 187.2, 36.1, 308/36.2; 277/56, 95

[56] References Cited

U.S. PATENT DOCUMENTS

| | | | |
|---|---|---|---|
| 2,908,536 | 10/1959 | Dickey | 308/187.1 |
| 2,912,264 | 11/1959 | Peck | 308/187.1 |
| 3,504,917 | 4/1970 | Malmstrom | 277/25 |
| 3,656,824 | 4/1972 | Ullberg | 308/187.1 |
| 3,679,277 | 7/1972 | Dohmen | 308/187.1 |
| 3,971,565 | 7/1976 | Schickling et al. | 308/187.1 |
| 4,153,259 | 5/1979 | Tokstensson | 277/75 |

FOREIGN PATENT DOCUMENTS

| | | | |
|---|---|---|---|
| 1109470 | 6/1961 | Fed. Rep. of Germany | 308/187.1 |
| 482873 | 4/1938 | United Kingdom | 308/187.1 |
| 1060473 | 3/1967 | United Kingdom | 15/34 |
| 1256852 | 12/1971 | United Kingdom | 15/44 |
| 1530987 | 11/1978 | United Kingdom | 33/78 |

OTHER PUBLICATIONS

*Torrington* Bulletin SKF-Dustac Series SNA, "Split Pillow Block Housings"-©1977.
Forsheda Gummifasrik AB-"Some Examples to Show How the V-Ring Can Be Used"-3/1973.

*Primary Examiner*—Willis Little
*Attorney, Agent, or Firm*—Marmaduke A. Hobbs

[57] ABSTRACT

A seal for a bearing having a housing with an opening therein for receiving a shaft, in which a sleeve is disposed in the housing opening and has an axial bore therethrough for receiving a shaft. The sleeve has a labyrinth seal section having intermeshing annular grooves and ribs on the inner periphery of the housing opening, and a V-ring section disposed externally of the labyrinth section, the latter section having an annular sealing means mounted on the sleeve and having a lip for seating on an annular sealing surface on the housing.

16 Claims, 6 Drawing Figures

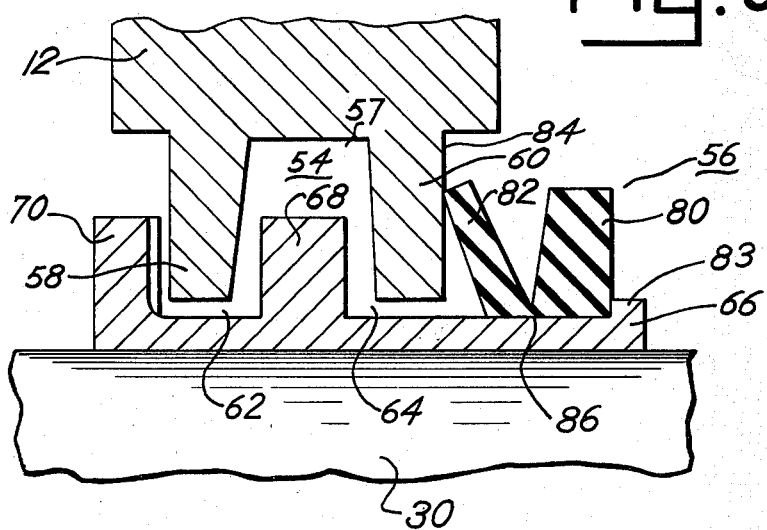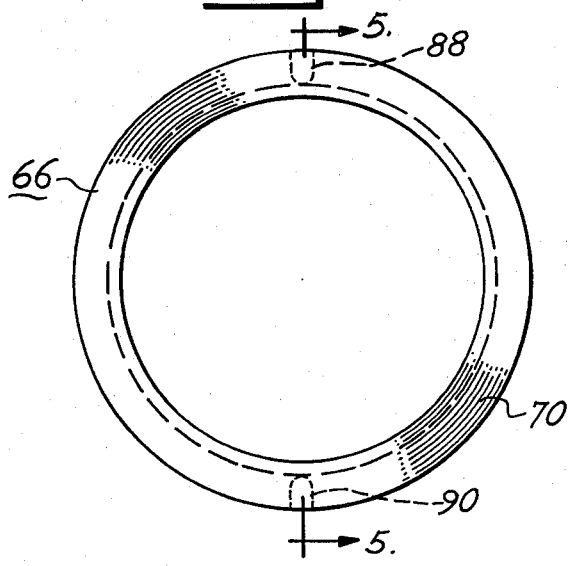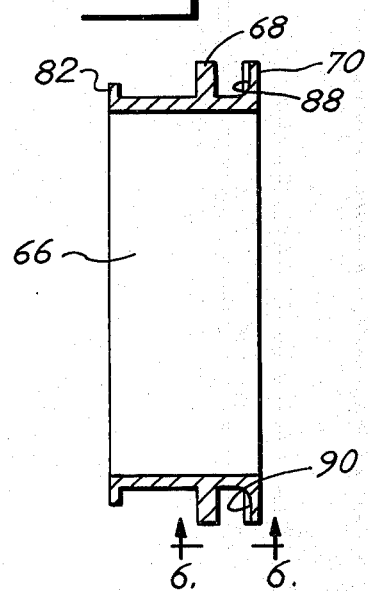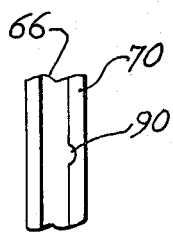

BEARING SEAL

In large shaft bearings, often referred to as pillow blocks, it is a common practice to seal the shaft in the opening in the housing, using a labyrinth seal normally consisting of two or three interrelated annular grooves and ribs on the shaft and in the opening in the housing. The labyrinth seal is, in effect, an open seal which, on smaller bearings, will fill with grease and provide effective purging during operation and lubrication of the bearing, while minimizing the ingress of moisture and foreign particulate matter which, once in the bearing, causes excessive wear of the operating parts. On larger bearings, the labyrinth seal often fails to perform satisfactorily, in that the grease injected in the housing usually settles into a sump or recess in the bottom and fails to fill the annular grooves in the seal, thus permitting the free flow of moisture and abrasive particulate matter through the seal into the bearing housing. Further, since the grease from the housing fails to fill the grooves of the seal, effective purging operations to remove dirt from the seal are not possible. In an effort to prevent the ingress of moisture and foreign matter into the bearing housing in the large bearings, an auxiliary seal is sometimes used externally of the labyrinth seal. The auxiliary seal is usually a V-ring type which is mounted firmly on and rotates with the shaft, and which has a lip seating on an annular radial surface on the housing adjacent the labyrinth seal. This type of seal, however, is not fully effective in that, as the shaft moves endwise during operation, the lip may become fully displaced from the radial sealing surface, thereby providing a space through which moisture and dirt can reach and pass through the labyrinth seal. Further, the labyrinth seal, either alone or in combination with the auxiliary seal, will not function effectively or give optimum performance when the bearing is used to journal a shaft in vertical position, thus limiting the range of uses of bearings with this type of seal structure. It is therefore one of the principal objects of the present invention to provide a seal for shaft bearings which is particularly adapted for large bearings, and which functions effectively irrespective of the position of the bearing and shaft.

Another object of the present invention is to provide a shaft seal for bearings such as pillow blocks, which maintains an effective seal between the shaft and the bearing housing regardless of axial movement of the shaft in the housing during normal operation of the bearing, and which permits the expulsion of moisture and gases from the bearing housing as the bearing heats up during operation, and prevents the ingress of air and dirt into the bearing housing as the bearing cools down after operation is discontinued.

A further object of the invention is to provide a seal for a shaft bearing, which is so constructed and designed that the shaft component of the seal is mounted as a unit on the shaft, and the parts thereof remain in proper operating position relative to the parts of the housing component of the seal, to obtain optimum operation irrespective of relative axial movement of the shaft and housing relative to one another.

Still another object is to provide a bearing seal of the aforementioned type in which a V-ring seal is used in combination with a labyrinth seal and is maintained in a fixed position with respect to the labyrinth seal throughout the operation of the bearing, and which permits effective purging of the seal of foreign material during normal operation and lubrication of the bearing, while minimizing the ingress of such material into the seal and bearing housing.

The present invention relates to a sealing structure for a shaft bearing, consisting of the combination of an inner labyrinth seal, an outer V-ring seal, and a sleeve which fits snugly on the shaft and forms part of the labyrinth seal and supports the V-ring seal. When the sleeve with the two seals is assembled in place on the shaft in the bearing housing, the lip of the V-ring seats on an annular radially extending sealing surface on the housing externally of the labyrinth seal. The shaft is capable of sliding axially relative to the sleeve during operation of the bearing to permit expansion of the shaft, thereby maintaining the proper operating relationship between the various parts of the combination seal on the shaft and in the housing. Any vapors or lubricant passing through the labyrinth seal can pass freely from the seal, in that the lip of the V-ring is sufficiently flexible to permit these materials to pass outwardly along the radial seal surface and then reseal the radial surface to prevent the ingress of moisture and dirt through the seal into the bearing.

While a number of objects and advantages of the present combination seal have been set forth hereinbefore, other advantages will become apparent from the following description and accompanying drawings, wherein:

FIG. 3 is an enlarged cross sectional view of one of the shaft seals used in the pillow block illustrated in FIGS. 1 and 2;

FIG. 4 is an end elevational view of the sleeve used in the seal shown in FIG. 3;

FIG. 5 is a transverse cross sectional view of the sleeve shown in the preceding figures, the section being taken on line 5—5 of FIG. 4; and FIG. 6 is a fragmentary elevational view of a portion of the sleeve shown in the preceding figures, the portion shown being indicated by lines 6—6 of FIG. 5.

Figure 1:
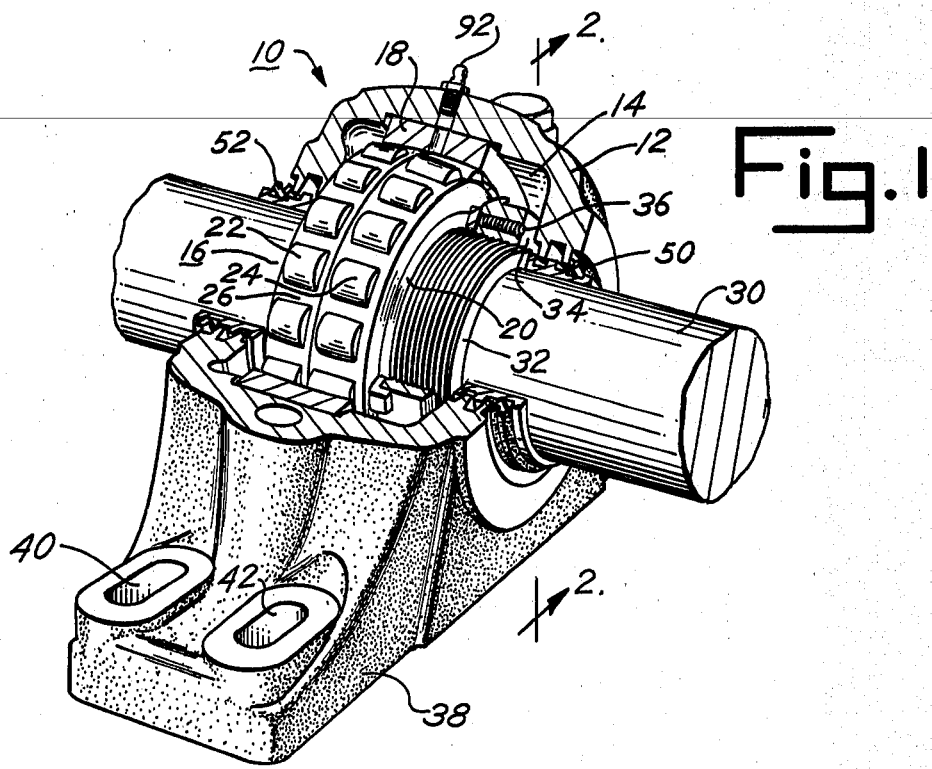
FIG. 1 is a perspective view of a pillow block and shaft, with a portion of the housing of the pillow block being broken away to show more effectively the seal between the shaft and the housing.
Figure 2:
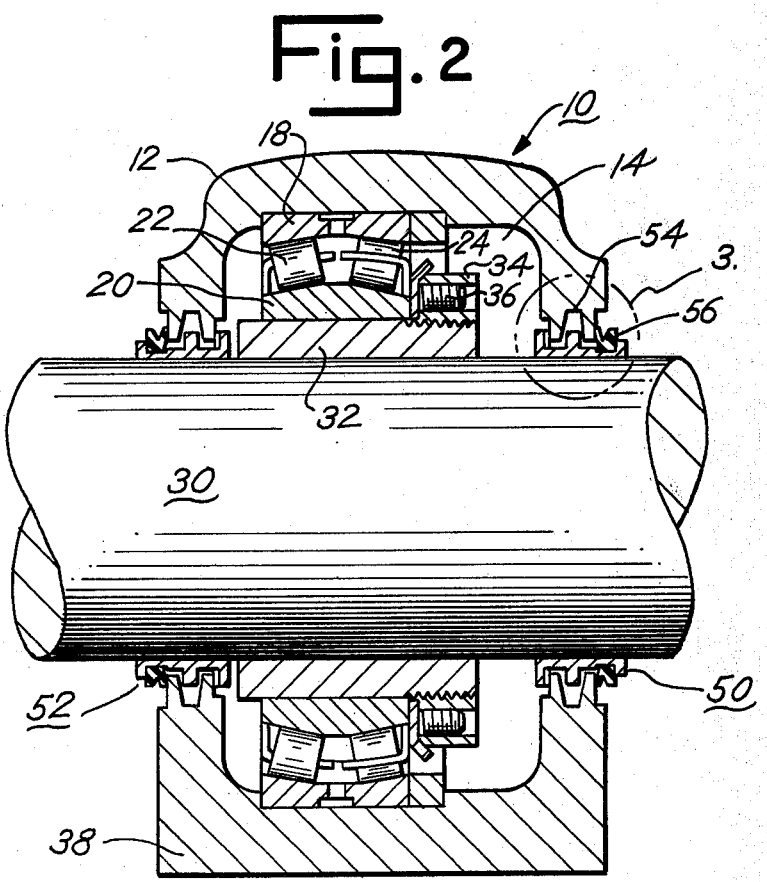
FIG. 2 is a vertical cross sectional view of the pillow block shown in FIG. 1 and an elevational view of the shaft journaled therein, the section being taken on line 2—2 of FIG. 1.

Referring more specifically to the drawings, and to FIGS. 1 and 2 in particular, numeral 10 indicates generally a pillow block having a housing 12 with a cavity 14 and a bearing assembly 16 mounted in the cavity and supported by the housing. The bearing assembly may, for the purpose of the present invention, be considered as conventional, and consists generally of an outer race 18, an inner race 20, and two rows of roller bearings 22 and 24, with the rollers being held in place between the outer and inner races by a cage 26. A shaft 30 extends through the openings on opposite sides of the housing, and the bearing assembly is mounted rigidly thereon by a tapered adapter 32 having a nut 34 threaded thereon for urging the adapter firmly in contact with the shaft and with the inner race, a plurality of set screws 36 equally spaced around the nut preferably being used for the final securing of the adapter in place on the shaft. The housing includes a base 38 having holes 40 and 42 on opposite sides for receiving bolts, studs or screws for mounting the pillow block on a firm support. The type of pillow block illustrated is the self aligning type which compensates for angular misalignment between the shaft and pillow block. While the present invention is designed primarily for large bearings, such as the pillow block described herein, the invention is applicable to various other types and sizes of bearings.

The shaft 30 is sealed at opposite ends of the pillow block housing by seals 50 and 52 which are identical in construction, design and operation to one another; thus, only seal 50 will be described in detail and the parts thereof identified by numerals. Seal 50 has two primary sections consisting of a labyrinth section 54 and a V-ring section 56. The labyrinth section consists of a groove 57 in the housing and two spaced annular ribs 58 and 60. Meshing with the two ribs and groove are spaced grooves 62 and 64 and an annular rib 68 forming a part of an elongated sleeve 66 mounted on shaft 30 in the respective shaft opening in the housing. The two ribs 58 and 60 extend into grooves 62 and 64 in spaced relation to the side walls thereof, and a flange 70 spaced from rib 58 completes the labyrinth seal. Labyrinth seals are extensively used in pillow blocks and other bearings, since they provide effective retention of the lubricant during operation and yet permit purging of the moisture and dirt therefrom when the bearing is lubricated. This effecitve sealing and lubricating operation is easily achieved in relatively small and medium size bearings; however, large pillow blocks involve a special problem in that the housing of the pillow block is often difficult to fill sufficiently with lubricant to cause the lubricant to flow into and fill the labyrinth seal. Attempts have been made to overcome the deficiencies of the labyrinth seal by the use of V-rings or the like seated on the shaft passing through the bearing wall; however, in the past these seals have at times been ineffective to prevent the entrance of dirt and moisture to the bearing, since, in most shaft bearing installations, the shaft tends to move axially relative to the bearings, and the V-ring seals move with the shaft, often unseating the lip of the V-ring from its sealing surface, thereby opening the labyrinth seal directly to the atmosphere. In the present invention, the foregoing difficulty has been overcome by the use of sleeve 66, which not only contains the grooves of the labyrinth seal but also supports the V-ring. With this construction involving the interlocking arrangement of the grooves and ribs of the labyrinth seal, any movement of the shaft causes only slight movement of the sleeve with the shaft relative to the seal portion on the housing. Since the sleeve is prevented from moving axially by the interlocking elements of the labyrinth seal, the shaft is capable of sliding axially relative to the sleeve while leaving the parts of the seal on the shaft and housing in proper operating position with respect to one another.

The V-ring seal illustrated in the drawings, which may be considered of a conventional construction, consists generally of a body 80 and a lip 82. The body seats on the periphery of sleeve 66 against a flange 83, and the lip seats on annular sealing surface 84 on the outer side of rib 60. The lip thus rubs constantly against sealing surface 84 as the V-ring rotates with the sleeve and shaft. The resilience of the lip, and the hinge indicated by numeral 86 of the V-ring, urge the lip into firm contact with annular sealing surface 84, and rib 83 prevents the V-ring from accidentally slipping away from the sealing surface 84 during the operation of the pillow block. The sleeve 66 fits snugly on the shaft, and vapor and foreign particulate matter are prevented from entering the bearing between the shaft and the sleeve; however, the fit between the sleeve and the shaft is sufficiently loose that the shaft is capable of moving relative to the sleeve when the shaft expands axially and the sleeve is retained by the interlocking ribs of the labyrinth seal section. A pair of lubrication grooves 88 and 90 are provided in the internal surface of flange 70 to facilitate entrance of the lubricant from the cavity in the housing into the labyrinth seal section. While the seal is preferably constructed of steel and hence expands and contracts with the shaft as the temperature of the two changes during operation, the sleeve may be constructed of other materials, including plastic. Regardless of the material from which the sleeve is made, a relatively close tolerance between the internal diameter of the sleeve and the external diameter of the shaft is maintained without causing binding to the extent that the shaft and sleeve cannot move relative to one another during the axial expansion or contraction of the shaft.

The type of bearing illustrated in the drawing is a divided housing having upper and lower sections, and as the shaft is inserted through the opening in the housing, it slips through adapter 32. After nut 34 of the adapter and screws 36 have been tightened to secure the bearing assembly 16 to the shaft, the cavity 14 of the housing is partially filled with lubricant and the upper section of the housing is secured in place. A fitting 92 is provided in the upper section of the housing for receiving a lubricating fixture from a source of lubricant for injecting lubricant into the bearing assembly and on smaller bearings to substantially fill the cavity 14 of the housing.

In the use and operation of the seal specifically described herein, the sleeves 66 of seals 50 and 52 with the V-rings mounted thereon are assembled in the openings on opposite sides of the housing. After the bearing and shaft have been placed in operation, the lubricant in the cavity finds its way through passages 88 and 90 and the grooves in the housing surrounding the shaft openings and in the sleeve, to form effective seals in the labyrinth section 54. As the operation continues, the pillow block and shaft become warm and possibly hot, thereby causing an increase in the vapor pressure in cavity 14 and causing the lubricant to flow outwardly through the labyrinth seal. This produces a purging action which removes any vapor or any foreign matter contained therein, the excess grease and foreign matter passing outwardly along lip 82 and sealing surface 84. Since lip 82 continually presses firmly against sealing surface 84, the ingress of moisture and particulate foreign material is prevented as the pillow block and shaft return to room temperature after operation thereof has been discontinued. Effective purging may also take place when the bearing is lubricated, by the flow of excess lubricant outwardly through the seal from cavity 14.

With the present construction, the seals 50 and 52 can be fully assembled in the plant, using the best techniques and best trained personnel to perform the operation, and leaving only the assembly of the shaft in the various components in the field; thus, effective relationship of the parts of the labyrinth and the V-ring seals is achieved during assembly and maintained during operation. Since the shaft can move axially relative to sleeve 66, the proper relationship between the labyrinth and V-ring sections is not disturbed by expansion and contraction of the shaft. When the shaft is used in a vertical position, the two seal sections may be reversed, with the V-ring seal positioned internally on the lower seal structure, so that the lip will prevent escape of the lubricant from the cavity by gravity. The upper seal structure remains as shown, thus providing purging action at the top of the bearing.

While only one embodiment of the present bearing seal has been described in detail herein, various changes and modifications may be made without departing from the scope of the invention.

I claim:

1. A seal for a shaft bearing having a housing with an opening therein for receiving a shaft: said seal comprising a sleeve for receiving a shaft, said sleeve extending through said opening for the shaft and being elongated and positioned axially with respect to the shaft and providing relative axial movement between the shaft and sleeve, a labyrinth sealing section having intermeshing, radially extending, annular grooves and ribs on the inner periphery of the opening and on the external periphery of said sleeve, an annular radially extending sealing surface on the housing adjacent one end of the opening in the housing, and a V-ring seal mounted on said sleeve adjacent said labyrinth section and spaced axially therefrom and having a lip thereon for seating on said radially extending sealing surface, the shaft being capable of sliding axially relative to the sleeve during operation of the bearing to permit expansion and contraction of the shaft, thereby maintaining the proper operating relationship between the various parts of the combination seal on the shaft and in the housing.

2. A seal for a bearing as defined in claim 1 in which two ribs on the periphery of said opening form a groove therebetween and a pair of ribs on said sleeve and said V-ring form a pair of spaced grooves.

3. A seal for a bearing as defined in claim 1 in which the bore through said sleeve is of a size such that said sleeve fits snugly on the shaft inserted therein.

4. A seal for a bearing as defined in claim 1 in which said sleeve has annular flanges on the inner and outer ends thereof, the inner flange forming a portion of the labyrinth seal and being provided with a radial groove in the inner surface for receiving lubricant from the bearing housing, and the flange on the outer end of the sleeve forming an abutment for preventing said V-ring from moving axially away from the labyrinth seal section.

5. A seal for a bearing as defined in claim 3 in which said sleeve has annular flanges on the inner and outer ends thereof, the inner flange forming a portion of the labyrinth seal and being provided with a radial groove in the inner surface for receiving lubricant from the bearing housing and the flange on the outer end of the sleeve forming an abutment for preventing said V-ring from moving axially away from the labyrinth seal section.

6. A seal for a bearing having a housing with an opening therein for receiving a shaft: said seal comprising a sleeve for receiving the shaft, said sleeve extending through said opening and being elongated and positioned axially with respect to the shaft and providing relative axial movement between the shaft and sleeve, a labyrinth sealing section having intermeshing, radially extending, annular grooves and ribs on the inner periphery of the opening and on the external periphery of said sleeve, and a yieldable sealing section disposed adjacent said labyrinth section and spaced axially therefrom and including an annular sealing surface on the housing adjacent one end of said labyrinth section, and an annular resilient sealing means mounted on said sleeve and having a lip for seating on said annular sealing surface, the shaft being capable of sliding axially relative to the sleeve during operation of the bearing to permit expansion and contraction of the shaft, thereby maintaining the proper operating relationship between the various parts of the combination seal on the shaft and in the housing.

7. A seal for a bearing as defined in claim 6 in which two ribs on the periphery of said opening form a groove therebetween and a rib on said sleeve extends into the groove in the periphery of said housing.

8. A seal for a bearing as defined in claim 6 in which the bore through said sleeve is of a size such that said sleeve fits snugly on the shaft inserted therein.

9. A seal for a bearing as defined in claim 6 in which said sleeve has annular flanges on the inner and outer ends thereof, the inner flange forming a portion of the labyrinth seal and being provided with a radial groove in the inner surface for receiving lubricant from the bearing housing and the flange on the outer end of the sleeve forming an abutment for preventing said resilient means from moving axially away from the labyrinth seal section.

10. A seal for a bearing as defined in claim 8 in which said sleeve has annular flanges on the inner and outer ends thereof, the inner flange forming a portion of the labyrinth seal and being provided with a radial groove in the inner surface for receiving lubricant from the bearing housing and the flange on the outer end of the sleeve forming an abutment for preventing said resilient means from moving axially away from the labyrinth seal section.

11. A seal for a bearing as defined in claim 10 in which said annular resilient sealing means is a V-ring seal.

12. In a bearing having a housing with a cavity therein, shaft openings on opposite sides of the housing, and a bearing assembly therein: a shaft seal for each of said openings comprising an elongated sleeve disposed axially in the respective opening for relative movement with respect to the shaft, a labyrinth sealing section having intermeshing, radially extending, annular grooves and ribs on the inner periphery of the opening and on the external periphery of said sleeve, an annular radially extending sealing surface on the housing adjacent the external end of the opening therein, and a resilient seal mounted on said sleeve external of said labyrinth section and having a lip thereon for seating on said radially extending sealing surface, said labyrinth sealing section and said resilient seal being disposed axially with respect to one another on the respective seal, the shaft being capable of sliding axially relative to the sleeve during operation of the bearing to permit expansion and contraction of the shaft, thereby maintaining the proper operating relationship between the various parts of the combination seal on the shaft and in the housing.

13. A seal for a bearing as defined in claim 12 in which said resilient seals is a V-ring and in which two ribs on the periphery of said opening form a groove therebetween and a pair of ribs on said sleeve and said V-ring form a pair of spaced grooves.

14. A seal for a bearing as defined in claim 12 in which the bore through said sleeve is of a size such that said sleeve fits snugly on the shaft inserted therein.

15. A seal for a bearing as defined in claim 12 in which said sleeve has annular flanges on the inner and outer ends thereof, the inner flange forming a portion of the labyrinth seal and being provided with a radial groove in the inner surface for receiving lubricant from the bearing housing and the flange on the outer end of the sleeve forming an abutment for preventing said resilient seals from moving axially away from the labyrinth seal section.

16. A seal for a bearing as defined in claim 13 in which said sleeve has annular flanges on the inner and outer ends thereof, the inner flange forming a portion of the labyrinth seal and being provided with a radial groove in the inner surface for receiving lubricant from the bearing housing and the flange on the outer end of the sleeve forming an abutment for preventing said V-ring from moving axially away from the labyrinth seal section.

* * * * *